United States Patent
Yang et al.

(10) Patent No.: US 9,559,464 B2
(45) Date of Patent: Jan. 31, 2017

(54) POSITIVE LOCKING CONFIRMATION MECHANISM FOR BATTERY CONTACT OF ELECTRIC VEHICLE

(71) Applicant: Aleees Eco Ark Co., Ltd., Bade, Taoyuan County (TW)

(72) Inventors: Anthony Antao Yang, Bade (TW); Gordon Ching Chen, Bade (TW)

(73) Assignee: ALEEES ECO ARK (CAYMAN) CO. LTD., Grand Cayman (KY)

( * ) Notice: Subject to any disclaimer, the term of this patent is extended or adjusted under 35 U.S.C. 154(b) by 0 days.

(21) Appl. No.: 15/029,849

(22) PCT Filed: Oct. 16, 2013

(86) PCT No.: PCT/CN2013/085298
§ 371 (c)(1),
(2) Date: Apr. 15, 2016

(87) PCT Pub. No.: WO2015/054840
PCT Pub. Date: Apr. 23, 2015

(65) Prior Publication Data
US 2016/0285203 A1   Sep. 29, 2016

(51) Int. Cl.
*H01R 13/64* (2006.01)
*H01R 13/641* (2006.01)
*H01M 2/30* (2006.01)
*H01M 2/34* (2006.01)
*H01R 4/56* (2006.01)

(52) U.S. Cl.
CPC ......... *H01R 13/641* (2013.01); *H01M 2/305* (2013.01); *H01M 2/34* (2013.01); *H01R 4/56* (2013.01); *H01M 2200/00* (2013.01); *H01M 2200/20* (2013.01); *H01M 2220/20* (2013.01)

(58) Field of Classification Search
CPC ..... F16B 37/122; F16B 37/125; F16B 37/127; H01R 11/289; H01R 13/641
USPC .................................................. 439/755, 766
See application file for complete search history.

(56) References Cited

U.S. PATENT DOCUMENTS

| 1,507,936 A | * | 9/1924 | Schmitt ............ H01R 11/283 |
| | | | 429/121 |
| 2,654,078 A | * | 9/1953 | Arthur ............... H01R 11/12 |
| | | | 411/270 |

(Continued)

FOREIGN PATENT DOCUMENTS

| CN | 101232082 | 7/2008 |
| CN | 201344916 | 11/2009 |

(Continued)

*Primary Examiner* — Ross Gushi
(74) *Attorney, Agent, or Firm* — Kirton McConkie; Evan R. Witt

(57) ABSTRACT

The present invention provides a positive locking confirmation mechanism for a battery contact of an electric vehicle. The positive locking confirmation mechanism uses a terminal bolt with an expansive tail section and judges whether the battery contact is in a positive locking state according to a voltage signal measured by a battery management unit. Before the battery contact is possibly not in the positive locking state, the system notifies the user to check and repair the possibly-loosened contact. Consequently, the problem of losing power or generating electric arc in the battery box will be avoided.

16 Claims, 3 Drawing Sheets

(56) References Cited

U.S. PATENT DOCUMENTS

| | | | | | |
|---|---|---|---|---|---|
| 3,566,947 | A | * | 3/1971 | Jukes | F16B 37/122 29/523 |
| 3,775,730 | A | * | 11/1973 | Rowls | H01R 11/289 429/65 |
| 3,783,439 | A | * | 1/1974 | Valentino | H01R 11/289 429/121 |
| 3,837,257 | A | * | 9/1974 | Fischer | F16B 13/066 411/18 |
| 3,848,506 | A | * | 11/1974 | Zifferer | F16B 13/124 411/17 |
| 3,898,907 | A | * | 8/1975 | Fischer | F16B 13/066 411/18 |
| 3,921,496 | A | * | 11/1975 | Helderman | F16B 19/1081 411/17 |
| 3,928,079 | A | * | 12/1975 | Jennings | H01M 2/305 429/121 |
| 4,235,151 | A | * | 11/1980 | Udert | F16B 13/12 411/52 |
| 4,288,504 | A | * | 9/1981 | Julian | H01R 11/284 429/179 |
| 4,351,890 | A | * | 9/1982 | Oxenreider | H01M 2/305 429/179 |
| 4,377,317 | A | * | 3/1983 | Shekel | H01R 11/24 429/121 |
| 4,391,559 | A | * | 7/1983 | Mizusawa | F16B 13/12 411/41 |
| 4,396,692 | A | * | 8/1983 | Eberle | H01M 2/305 429/179 |
| 4,424,854 | A | * | 1/1984 | Tiegel | B22D 25/04 164/98 |
| 4,446,214 | A | * | 5/1984 | Mocas | H01M 2/305 29/623.2 |
| 4,448,863 | A | * | 5/1984 | Terrell | H01M 2/305 429/121 |
| 4,478,919 | A | * | 10/1984 | Tiegel | B22D 25/04 420/572 |
| 4,609,238 | A | * | 9/1986 | Jamgotchian | H01R 11/30 439/39 |
| 4,643,511 | A | * | 2/1987 | Gawlik | H01R 11/289 439/755 |
| 4,653,132 | A | * | 3/1987 | Yamada | B23P 15/00 29/437 |
| 4,673,240 | A | * | 6/1987 | Byfield, Jr. | H01M 2/305 411/378 |
| 4,729,934 | A | * | 3/1988 | Krystaszek | H01M 2/305 429/179 |
| 4,752,543 | A | * | 6/1988 | Anderson | H01M 2/043 429/122 |
| 4,797,111 | A | * | 1/1989 | Ackmann | H01R 11/01 439/755 |
| 4,936,799 | A | * | 6/1990 | Woodall | H01R 11/289 439/754 |
| 5,013,259 | A | * | 5/1991 | Maurer | H01R 11/288 439/504 |
| 5,017,067 | A | * | 5/1991 | Ohlin | F16B 13/124 411/45 |
| 5,021,013 | A | * | 6/1991 | Wiesler | H01R 11/289 439/754 |
| 5,281,493 | A | * | 1/1994 | Jones | H01R 11/281 429/179 |
| 5,373,105 | A | * | 12/1994 | Nagaune | H01L 23/04 174/539 |
| 5,662,497 | A | * | 9/1997 | Reilly | H01R 11/288 429/158 |
| 5,688,066 | A | * | 11/1997 | Loose | F16B 13/12 403/297 |
| 6,025,088 | A | * | 2/2000 | Kump | H01M 2/305 429/121 |
| 6,190,796 | B1 | * | 2/2001 | Chalasani | H01M 2/30 429/100 |
| 6,258,481 | B1 | * | 7/2001 | Ross | H01M 2/307 429/170 |
| 6,312,852 | B1 | * | 11/2001 | Wagner | H01M 2/06 429/163 |
| 6,395,421 | B1 | * | 5/2002 | Partington | H01M 2/0212 429/127 |
| 6,739,813 | B1 | * | 5/2004 | Gundy | F16B 13/02 411/377 |
| 6,874,984 | B2 | * | 4/2005 | Lin | F16B 13/0858 411/44 |
| 6,926,483 | B2 | * | 8/2005 | Hesse | F16B 5/0258 411/17 |
| 7,344,421 | B1 | * | 3/2008 | Spencer | H01R 11/282 439/286 |
| 7,641,522 | B2 | * | 1/2010 | Carcangiu | H01R 4/366 439/271 |
| 8,047,868 | B1 | * | 11/2011 | Korczynski | H01R 4/302 439/522 |
| 8,992,147 | B2 | * | 3/2015 | Armiento | B25B 31/00 411/45 |
| 8,992,621 | B2 | * | 3/2015 | Chauvin | A61F 2/4455 623/17.16 |
| 9,099,730 | B2 | * | 8/2015 | Thuerk | H01M 2/043 |
| 9,382,936 | B2 | * | 7/2016 | Chan | F16B 33/004 |
| 2001/0022925 | A1 | * | 9/2001 | Reed | B23P 6/04 411/178 |
| 2003/0063959 | A1 | * | 4/2003 | Kao | F16B 13/066 411/60.2 |
| 2004/0259431 | A1 | * | 12/2004 | Delcourt | H01R 4/30 439/766 |
| 2005/0084360 | A1 | * | 4/2005 | Panasik | F16B 37/127 411/44 |
| 2007/0117471 | A1 | * | 5/2007 | Wagner | H01R 11/03 439/755 |
| 2008/0038079 | A1 | * | 2/2008 | Bobon | F16B 5/0216 411/57.1 |
| 2008/0240883 | A1 | * | 10/2008 | Walling | F16B 37/125 411/178 |
| 2009/0042098 | A1 | * | 2/2009 | Nakayama | H01M 2/043 429/179 |
| 2009/0297943 | A1 | * | 12/2009 | Bielawski | H01M 2/0242 429/179 |
| 2010/0322738 | A1 | * | 12/2010 | Lau | F16B 37/125 411/17 |
| 2010/0329814 | A1 | * | 12/2010 | Strom | F16B 37/127 411/172 |
| 2011/0300435 | A1 | | 12/2011 | Byun | |

FOREIGN PATENT DOCUMENTS

| | | |
|---|---|---|
| CN | 202189856 | 4/2012 |
| JP | 2004207153 | 7/2004 |

* cited by examiner

POSITIVE LOCKING CONFIRMATION MECHANISM FOR BATTERY CONTACT OF ELECTRIC VEHICLE

FIELD OF THE INVENTION

The present invention relates to a positive locking confirmation mechanism and a positive locking confirmation method for a battery contact of a battery pack in a battery box of an electric vehicle, and more particularly to a device of using a voltage sensor or a current sensor of a battery management unit to sense the locking state and confirming the positive locking state of a great number of battery contacts in a battery box and a technology of warning and indicating the user to check specified contacts before the contact of any battery contact is loosened. The technology of the present invention is applied to the electric vehicles requiring a great number of battery packs (e.g., electric buses or electric trucks).

BACKGROUND OF THE INVENTION

Generally, a battery pack of a large electric vehicle comprises several hundreds of batteries. These batteries are connected with each other in parallel or in series. However, if the battery contacts are not securely locked, the batteries of the battery pack are possibly loosened. Especially, when the electric vehicle is driven on a road with a poor condition, the vibration of electric vehicle may accelerate the problem of loosening the battery contacts. If the battery contacts are loosened or poorly contacted during the travelling process of the electric vehicle, the overall power system is possibly shut down or burnt out.

However, the conventional electrode connecting method cannot indicate whether the electrodes are certainly locked. If the battery pack is suffered from a poor contact problem, the worker cannot immediately realize the damaged site. Under this circumstance, the time period of checking the battery pack is largely increased. Moreover, since the electric vehicle is only powered by the battery pack, the reliability of the battery pack is an important factor influencing performance of the electric vehicle.

SUMMARY OF THE INVENTION

An object of present invention provides a positive locking confirmation mechanism for increasing the efficacy of assembling the battery contacts and confirming the positive locking state of the battery contact in order to overcome the drawbacks of the conventional technology.

Another object of present invention provides a warning means of issuing a warning prompt when the battery contact is possibly loosened. The warning prompt can notify the maintenance worker to check and repair the battery pack.

Another object of present invention provides an identifying means for facilitating the maintenance worker to identify the electrode that is possibly loosened.

In accordance with an aspect of the present invention, there is provided a positive locking confirmation mechanism for a battery contact of an electric vehicle. The positive locking confirmation mechanism includes a terminal bolt, a sensing bolt and a sensing unit. The terminal bolt is locked on an electrode, so that a conductor is contacted with the electrode. The sensing bolt is locked on the terminal bolt, so that a sensing contact is contacted with the terminal bolt. While the sensing bolt is screwed into the terminal bolt, the terminal bolt is subjected to deformation. A drag force is generated to fix the terminal bolt in response to the deformation of the terminal bolt. The sensing unit is used for detecting whether the sensing contact and the terminal bolt are in a positive locking state.

In an embodiment, the terminal bolt is subjected to deformation through a pin.

In an embodiment, the terminal bolt has a taper structure, and the taper structure is contacted with the pin.

In an embodiment, the pin has a thread.

In an embodiment, the sensing unit judges whether the sensing contact and the terminal bolt are in the positive locking state according to a result of judging whether a voltage signal from the sensing contact is stable.

In an embodiment, the sensing bolt is made of an insulation material.

In an embodiment, an insulation packing is arranged between the sensing bolt and the sensing contact.

In an embodiment, the sensing bolt and the sensing contact are connected with each other through a safety rope.

In an embodiment, the sensing unit is a battery protection board.

In accordance with another aspect of the present invention, there is provided a positive locking confirmation mechanism for a battery contact of an electric vehicle. The positive locking confirmation mechanism includes a terminal bolt, a sensing bolt and a controlling unit. The terminal bolt is used for locking a conductor on an electrode of a battery. A head portion of the terminal bolt has an internal thread. A tail end of the terminal bolt has an expansive section. The sensing bolt is screwed into the internal thread of the terminal bolt so as to lock a sensing contact of a voltage sensor. While the sensing bolt is screwed into the internal thread of the terminal bolt, a pin is pushed by the sensing bolt to prop open the expansive section of the terminal bolt, so that the terminal bolt and the electrode of the battery are in a positive locking state. The controlling unit is used for receiving a voltage signal from the voltage sensor and judging whether the terminal bolt and the electrode of the battery are in the positive locking state according to a result of judging whether the voltage signal is stable.

In an embodiment, when the voltage signal is unstable, the electrode of the battery is not in the positive locking state, and the controlling unit issues a warning signal and an identification code of the electrode to a vehicular controller.

In an embodiment, a non-conductive coating is formed on a contact area between the sensing bolt and the sensing contact of the voltage sensor.

In an embodiment, the sensing bolt is not electrically conductive.

In an embodiment, the sensing bolt and the pin are integrally formed as a one-piece structure.

In an embodiment, the voltage sensor further includes an accelerometer for sensing vibration of the electric vehicle.

In an embodiment, the voltage sensor further includes a gyroscope for sensing motion of the electric vehicle.

The above contents of the present invention will become more readily apparent to those ordinarily skilled in the art after reviewing the following detailed description and accompanying drawings, in which:

Figure 1:
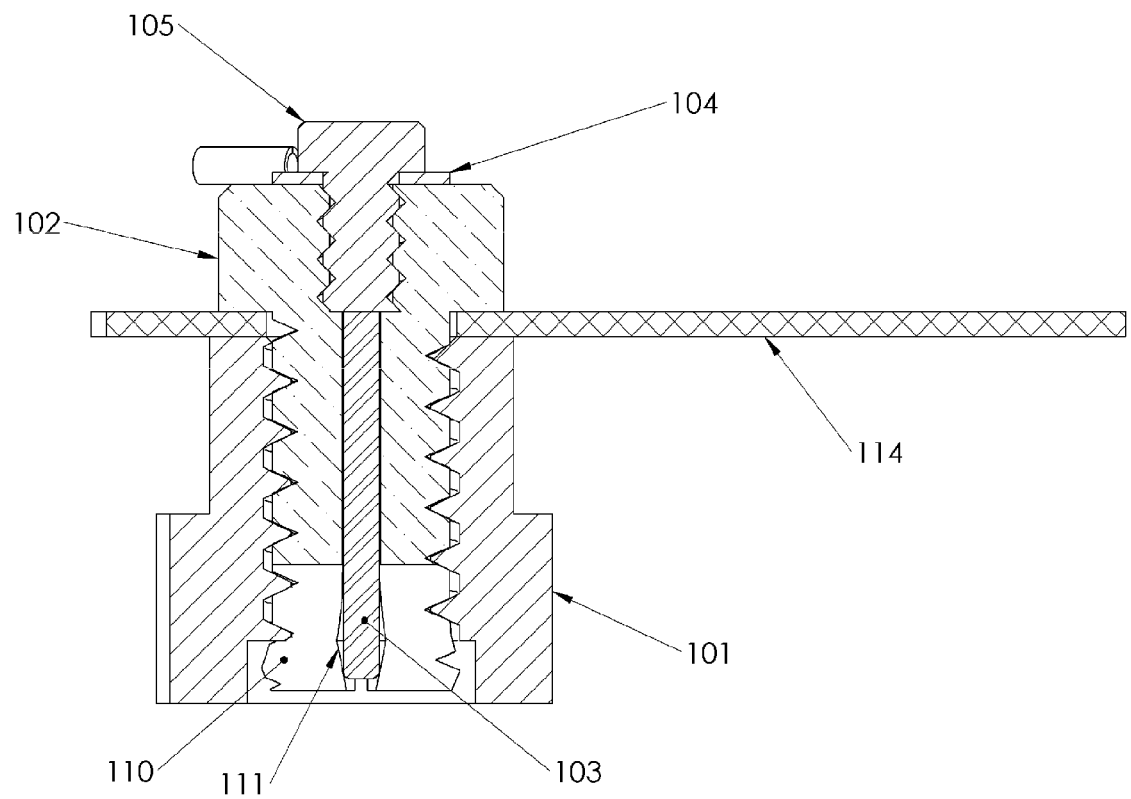
FIG. 1 is a schematic cross-sectional view illustrating a positive locking confirmation mechanism according to an embodiment of the present invention.

Element numerals in the drawings is illustrated as follows: 101, electrode; 102, terminal bolt; 103, pin; 104, sensing contact; 105, sensing bolt; 106, central hole; 107, slot of the expansive section; 108, electrode thread; 110, expansive section; 111, taper structure; 112, internal opening; 113, internal thread; 114, conductor; and 115, external thread.

DETAILED DESCRIPTION OF THE PREFERRED EMBODIMENT

Figure 2:
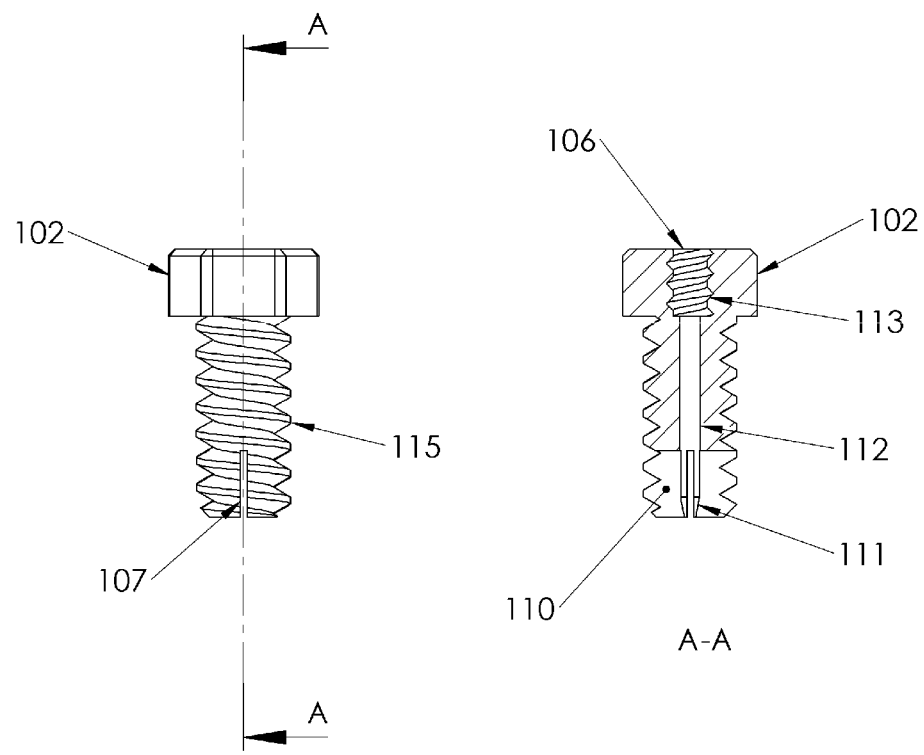
FIG. 2 is a schematic cross-sectional view illustrating a terminal bolt of the positive locking confirmation mechanism according to the embodiment of the present invention.
Figure 3:
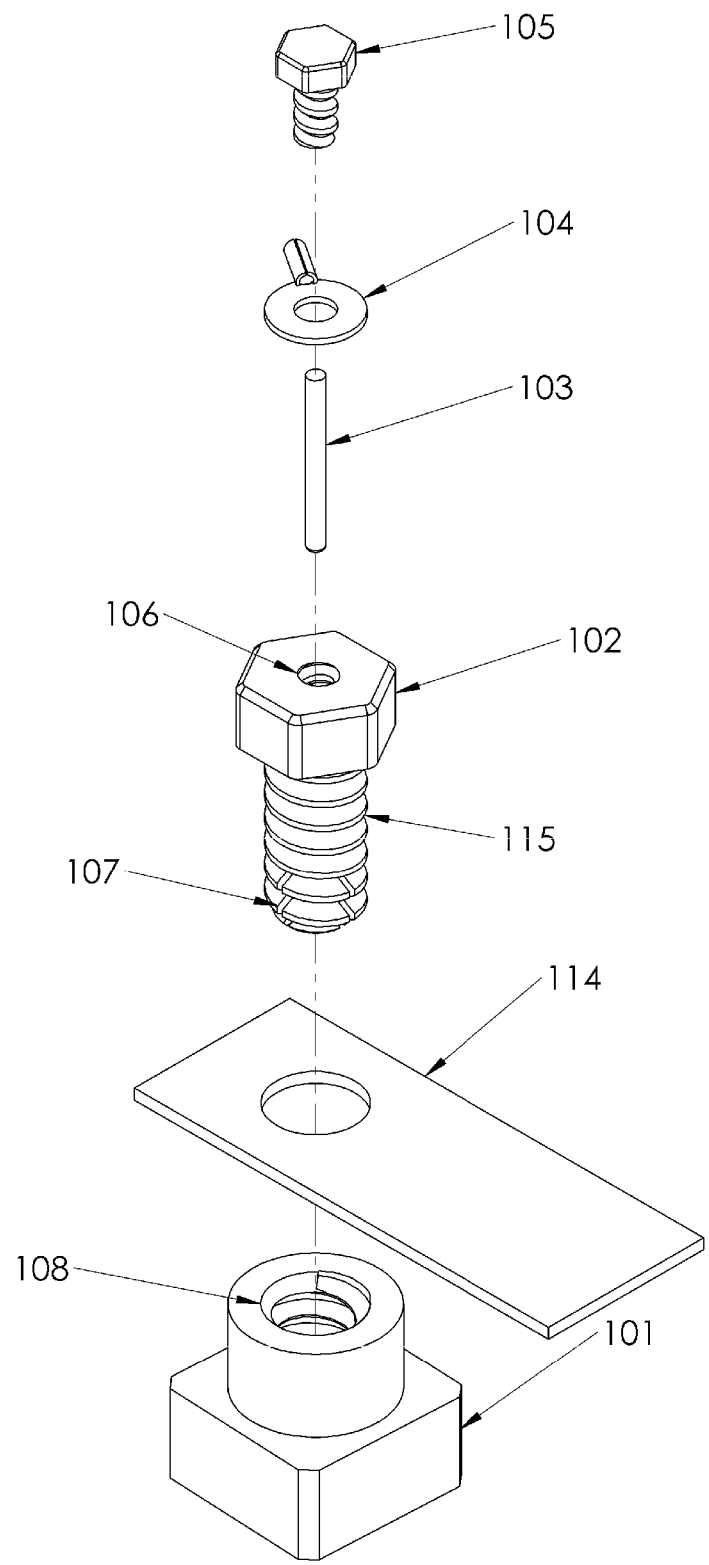
FIG. 3 is a schematic exploded view illustrating the positive locking confirmation mechanism according to the embodiment of the present invention.

Hereinafter, a positive locking confirmation mechanism for a battery contact of an electric vehicle according to an embodiment of the present invention will be illustrated with reference to FIGS. 1 to 3. The positive locking confirmation mechanism for a battery contact of an electric vehicle comprises a terminal bolt 102, a sensing bolt 105, a pin 103, a conductor 114, a sensing contact 104 and an electrode 101. The terminal bolt 102 comprises a central hole 106. The central hole 106 has three segments. A first segment of the central hole 106 is an internal thread 113 to be engaged with the sensing bolt 105. A second segment of the central hole 106 is an internal opening 112 for accommodating the pin 103. A third segment of the central hole 106 is a taper structure 111 for providing an expansion force by the pin 103.

When a pressure is applied to the pin 103 through the sensing bolt 105, an expansive section 110 of the terminal bolt 102 is propped open. Consequently, the terminal bolt 102 is in a positive locking state. While the sensing bolt 105 is screwed into the internal thread 113, the pin 103 is pushed by the sensing bolt 105. Moreover, the tip of the pin 103 is contacted with the taper structure 111 to generate an expansion force. In response to the expansion force, the expansive section 110 of the terminal bolt 102 is propped open. Due to the expansion force applied to the expansive section 110 of the terminal bolt 102, the terminal bolt 102 and an electrode thread 108 can be securely combined together.

In accordance with a positive locking design of the present invention, the sensing bolt 105 results in deformation of the expansive section 110 of the terminal bolt 102. Due to the deformation of the expansive section 110, the positive locking state of the terminal bolt 102 can be confirmed. Consequently, the locking state of the sensing bolt 105 can facilitate the positive locking state of the terminal bolt 102. If the sensing bolt 105 is loosened, the sensing contact 104 is separated from the terminal bolt 102 because of the vibration of the electric vehicle. Under this circumstance, the voltage signal is subjected to a change.

In accordance with another positive locking design of the present invention, a computing process is performed to detect the stability of the voltage signal in order to judge whether the positive locking state is maintained. In a normal working condition, the output voltage of battery is very stable. Consequently, if the voltage signal is interrupted because of the vibration of the electric vehicle, the system judges that the battery contact is no longer in the positive locking state.

On the other hand, if the sensing bolt 105 is loosened and the sensing contact 104 and the terminal bolt 102 are not in close contact with each other, the system can realize that the battery contact is possibly loosened according to the interrupted voltage signal. In addition, the system will indicate the battery contact that needs to be checked and repaired. Consequently, the maintenance worker can check and repair the battery contact before the battery contact is loosened.

Moreover, a computing unit is used for performing the computing process. That is, the computing unit continuously detects whether the voltage signal is stable. More preferably, the computing unit further comprises an accelerometer or a gyroscope. If the frequency of the unstable voltage signal matches the vibration frequency of the vehicle body, the computing unit can accurately judge that the battery contact is about to be loosened. By checking whether the frequency of the voltage signal matches the vibration frequency of the vehicle body, the misjudgment from the electromagnetic interference will be minimized. In some embodiments, the current signal and the voltage signal are both taken into consideration. If the current signal is stable but the voltage signal is interrupted, the system judges that the sensing contact is possibly loosened.

Moreover, in some embodiment, the sensing bolt is specially designed. Preferably, the sensing bolt is made of an insulation material. Consequently, when the sensing bolt is in the positive locking state, the sensing contact can acquire the voltage signal through the terminal bolt only. Moreover, when the sensing bolt is loosened, the sensing contact cannot acquire the voltage signal through the terminal bolt. Under this circumstance, the system can accurately sense whether the sensing bolt is loosened. In some other embodiments, the sensing bolt is a metal bolt with an insulation coating.

For simplifying the assembling process, the sensing bolt and the pin are integrally formed as a one-piece structure. In another embodiment, the sensing bolt has a recess, and the pin is fixed in the recess. Preferably, the pin is fixed in the recess of the sensing bolt in a press-fit manner. Consequently, the pin will not be detached from the sensing bolt.

In case that the pin is detachably connected with the sensing bolt, the pin is preferably equipped with a thread to be engaged with the terminal bolt. After the pin is screwed into the terminal bolt, the sensing bolt is screwed into the terminal bolt.

Preferably, a non-conductive coating is formed on a contact area between the sensing contact and the sensing bolt. In some embodiments, the non-conductive coating is replaced by an insulation packing.

For preventing the issues that the sensing bolt is loosened and drops down to the battery pack, the sensing bolt and the sensing contact are connected with each other through a safety rope. Consequently, even if the sensing bolt is loosened, the sensing bolt will not drop down to the battery pack.

The present invention provides a positive locking confirmation mechanism. The concepts of the present invention will be described as follows.

Firstly, if the system can acquire a stable voltage signal through the sensing contact 104, the sensing bolt 105 and the pin 103 are certainly accommodated within the central hole 106. Since the taper structure 111 is pushed by the pin 103, the expansive section 110 is subjected to deformation. In response to the deformation of the expansive section 110, the terminal bolt 102 and the electrode thread 108 are compressed against each other. Under this circumstance, a large drag force is generated to confirm the positive locking state of the terminal bolt 102.

Secondly, if the system receives the interrupted voltage signal, the sensing bolt 105 and the pin 103 are still accommodated within the central hole 106 but the pin 103 is no longer contacted with the taper structure 111. Consequently, the expansive section 110 is restored to its original shape. Under this circumstance, the terminal bolt 102 is not in the positive locking state. That is, the terminal bolt 102 is possibly loosened.

Preferably, if the system detects that any battery contact is possibly loosened, the system will notify the user to check the possibly-loosened contact. When the electric vehicle is driven to the maintenance station, the maintenance worker can recognize the possibly-loosened contact according to the identification code of the corresponding battery. By using the positive locking confirmation mechanism of the present invention, the maintenance time is largely reduced, and the injury and damage caused by the loosened contact are minimized.

What is claimed is:

1. A positive locking confirmation mechanism for a battery contact of an electric vehicle, the positive locking confirmation mechanism comprising:
    a terminal bolt locked on an electrode, so that a conductor is contacted with the electrode;
    a sensing bolt locked on the terminal bolt, so that a sensing contact is contacted with the terminal bolt, wherein while the sensing bolt is screwed into the terminal bolt, the terminal bolt is subjected to deformation, wherein a drag force is generated to fix the terminal bolt in response to the deformation of the terminal bolt; and
    a sensing unit configured for detecting whether the sensing contact and the terminal bolt are in a positive locking state.

2. The positive locking confirmation mechanism for the battery contact of the electric vehicle according to claim 1, wherein the terminal bolt is subjected to deformation through a pin.

3. The positive locking confirmation mechanism for the battery contact of the electric vehicle according to claim 2, wherein the terminal bolt has a taper structure, and the taper structure is contacted with the pin.

4. The positive locking confirmation mechanism for the battery contact of the electric vehicle according to claim 2, wherein the pin has a thread.

5. The positive locking confirmation mechanism for the battery contact of the electric vehicle according to claim 1, wherein the sensing unit judges whether the sensing contact and the terminal bolt are in the positive locking state according to a result of judging whether a voltage signal from the sensing contact is stable.

6. The positive locking confirmation mechanism for the battery contact of the electric vehicle according to claim 1, wherein the sensing bolt is made of an insulation material.

7. The positive locking confirmation mechanism for the battery contact of the electric vehicle according to claim 1, wherein an insulation packing is arranged between the sensing bolt and the sensing contact.

8. The positive locking confirmation mechanism for the battery contact of the electric vehicle according to claim 1, wherein the sensing bolt and the sensing contact are connected with each other through a safety rope.

9. The positive locking confirmation mechanism for the battery contact of the electric vehicle according to claim 1, wherein the sensing unit is a battery protection board.

10. A positive locking confirmation mechanism for a battery contact of an electric vehicle, the positive locking confirmation mechanism comprising:
    a terminal bolt configured for locking a conductor on an electrode of a battery, wherein a head portion of the terminal bolt has an internal thread, and a tail end of the terminal bolt has an expansive section;
    a sensing bolt screwed into the internal thread of the terminal bolt so as to lock a sensing contact of a voltage sensor, wherein while the sensing bolt is screwed into the internal thread of the terminal bolt, a pin is pushed by the sensing bolt to prop open the expansive section of the terminal bolt, so that the terminal bolt and the electrode of the battery are in a positive locking state; and
    a controlling unit configured for receiving a voltage signal from the voltage sensor and judging whether the terminal bolt and the electrode of the battery are in the positive locking state according to a result of judging whether the voltage signal is stable.

11. The positive locking confirmation mechanism for the battery contact of the electric vehicle according to claim 10, wherein when the voltage signal is unstable, the electrode of the battery is not in the positive locking state, and the controlling unit issues a warning signal and an identification code of the electrode to a vehicular controller.

12. The positive locking confirmation mechanism for the battery contact of the electric vehicle according to claim 10, wherein a non-conductive coating is formed on a contact area between the sensing bolt and the sensing contact of the voltage sensor.

13. The positive locking confirmation mechanism for the battery contact of the electric vehicle according to claim 10, wherein the sensing bolt is not electrically conductive.

14. The positive locking confirmation mechanism for the battery contact of the electric vehicle according to claim 10, wherein the sensing bolt and the pin are integrally formed as a one-piece structure.

15. The positive locking confirmation mechanism for the battery contact of the electric vehicle according to claim 10, wherein the voltage sensor further comprises an accelerometer for sensing vibration of the electric vehicle.

16. The positive locking confirmation mechanism for the battery contact of the electric vehicle according to claim 10, wherein the voltage sensor further comprises a gyroscope for sensing motion of the electric vehicle.

* * * * *